United States Patent
Vogt et al.

(10) Patent No.: US 8,299,413 B2
(45) Date of Patent: Oct. 30, 2012

(54) METHOD FOR PIXEL SHIFT CALCULATION IN DIGITAL SUBTRACTION ANGIOGRAPHY AND X-RAY DIAGNOSTIC IMAGING SYSTEM FOR GENERATING IMAGES IN DIGITAL SUBTRACTION ANGIOGRAPHY

(75) Inventors: Florian Vogt, Effeltrich (DE); John Baumgart, Hoffman Estates, IL (US)

(73) Assignee: Siemens Aktiengesellschaft, München (DE)

( * ) Notice: Subject to any disclaimer, the term of this patent is extended or adjusted under 35 U.S.C. 154(b) by 843 days.

(21) Appl. No.: 12/350,395

(22) Filed: Jan. 8, 2009

(65) Prior Publication Data
US 2010/0172474 A1    Jul. 8, 2010

(51) Int. Cl.
*H01L 27/00* (2006.01)
(52) U.S. Cl. .................... 250/208.1; 250/214 R
(58) Field of Classification Search ............... 250/208.1, 250/214 R; 382/128–236; 378/62–65; 600/407–436
See application file for complete search history.

(56) References Cited

U.S. PATENT DOCUMENTS

| | | | |
|---|---|---|---|
| 4,870,692 A | 9/1989 | Zuiderveld et al. | |
| 4,995,064 A | 2/1991 | Wilson et al. | |
| 5,481,653 A * | 1/1996 | Kashiwagi et al. | 345/418 |
| 5,690,106 A | 11/1997 | Bani-Hashemi et al. | |
| 7,826,884 B2 * | 11/2010 | Baumgart | 600/407 |
| 2008/0027316 A1 | 1/2008 | Baumgart | |
| 2008/0101670 A1 | 5/2008 | Baumgart et al. | |

FOREIGN PATENT DOCUMENTS

JP    2006187511 A1    7/2006

* cited by examiner

*Primary Examiner* — Que T Le

(57) ABSTRACT

An X-ray diagnostic imaging system for generating images in digital subtraction angiography is proposed. A mask image frame of a patient and a series of live image frames of the patient acquired in the same imaging position of the mask frame acquisition are accessed. One of the mask and the live image frames is contrast-enhanced. Possible shift vectors in a region of interest are assumed being a difference vector between the mask and a respective live image frame and a scoring is calculated. Possible shift vector with the highest scoring is chosen as an elected shift vector. A likelihood representing a quality value of the elected shift vector is calculated. The mask image frame is shifted with respect to the respective live image frame by a modified shift vector depending on the likelihood. The shifted mask image frame is subtracted from the respective live image frame and is displayed.

15 Claims, 5 Drawing Sheets

METHOD FOR PIXEL SHIFT CALCULATION IN DIGITAL SUBTRACTION ANGIOGRAPHY AND X-RAY DIAGNOSTIC IMAGING SYSTEM FOR GENERATING IMAGES IN DIGITAL SUBTRACTION ANGIOGRAPHY

FIELD OF THE INVENTION

The present invention relates to subtraction angiography, and more particularly relates to an X-ray diagnostic imaging system and method for correcting for motion between acquired frames in angiographic roadmapping procedures.

BACKGROUND OF THE INVENTION

Angiography refers generally to the capture and representation of blood vessels or vasculature of the human body by means of X-ray imaging, i.e., X-ray vascular imaging. X-ray diagnostic imaging systems may be used for angiographic imaging procedures such as digital subtraction angiography (DSA), and live fluoroscopic roadmapping. Digital subtraction angiography or DSA is an imaging method used for visualizing blood vessels inside a patient's body that includes injecting a contrast medium bolus that is substantially opaque to X-rays into the blood vessels or vasculature under study as images are acquired by the X-ray diagnostic imaging system. Prior to acquisition of the contrast image, a mask image without contrast is acquired. A difference image is calculated by superimposing upon and subtracting the mask image from the contrast image. Ideally, nothing appears in the difference image other than the image of the blood vessels. Because of the time difference between acquisition of the mask image (no contrast) and acquisition of the contrast-enhanced images, global and periodic motion, fluctuations in the intensity of the X-ray source, scattering by the contrast medium, etc., unwanted artifacts may appear in the differenced or digitally subtracted angiographic image. U.S. Pat. No. 5,690,106, to Bani-Hashemi, et al. ("the '106 patent"), discloses a flexible image registration system for conducting digital subtraction angiography (DSA) with a C-arm rotational X-ray system.

Like DSA, fluoroscopic roadmapping is an angiographic imaging method for vascular imaging in which two images are overlaid to visualize blood vessels in a particular bodily area, e.g., the chest area. But unlike DSA, roadmapping includes superimposing upon and subtracting a stored 2D contrast-enhanced image (i.e., a mask image) from a current or live fluoroscopic image of the same vessel area (i.e., a non-contrast-enhanced image). Because only the stored mask image is acquired while the vessels are opacified with contrast medium the patient is generally exposed to lower levels of contrast agent as compared with a DSA study. Typically, live fluoroscopic or fluoro imaging uses lower radiation intensity as compared to DSA. U.S. Pat. No. 4,995,064 ("the '064 patent"), commonly-owned, discloses an X-ray examination apparatus that may be used for live fluoroscopic ("fluoro") roadmapping.

Live fluoro roadmapping supports various endovascular procedures such as percutaneous transluminal coronary angioplasty, where the contrast image is superimposed on a series of live 2D fluoro images acquired while a catheter is moved through the vasculature under study. The acquired mask or contrast image frame is superimposed on the real-time non-contrast-enhanced live frames as they are acquired, and subtracted in real time. The result is a static display of the vascular structures, typically displayed in white, while the catheter appears in black. Like DSA, however, misregistration due to global and periodic motion, etc., can result in image artifacts in the subtracted live fluoro roadmapping, which degrade image quality.

To correct for misregistration, various conventional processes have developed. For example, U.S. Pat. No. 4,870,692 ("the '692 patent") discloses a method of correcting subtraction images for patient motion in a fluoroscopy system. The method includes automatically dissecting the mask and contrast images into subregions. The pixels in those subregions are then compared using a cross-correlation correction algorithm. The cross-correlation correction algorithm ideally calculates a shift vector based on a portion of the image that has shifted by motion in one or more sub-images. The shift vector shifts the mask image to better align it with the non-contrast enhanced image or images of the same position. For each shift vector, there are several storage locations for storing its position, direction components and reliability criteria for each component.

Another known method, somewhat related to the current inventive X-ray imaging system and method for live fluoro roadmapping includes automatic sampling the acquired live images or frames (non contrast-enhanced) into the system's background process, which searches a large arbitrary region of interest (ROI) for the "best" shift vector. The sampling and searching, however, is very operation intensive and not conducive to accurate real-time correction. This is because the automatic sample, search and compare process must search the entire large region to generate the best shift vector using conventional methods. In particular, the large area for search and comparison is typically a center quarter (¼) of the image frame, or one quarter (¼) of the image area that contains the greatest amount of image or feature information.

US 2008/0027316 A1 discloses a system and a method wherein a user has to define a particular small ROI which is used for realizing a pixel shift vector.

SUMMARY OF THE INVENTION

The problem of the invention is that the images acquired during the subtraction angiography, in particular during roadmapping, are sampled in a background process that searches a large arbitrary regional interest for a best shift vector. This sampling in the background process is time-consuming and is, therefore, not real-time and causes a certain latency. Once calculated, this shift vector is given back to the image processing pipeline to apply until such time as the next shift vector can be calculated. These calculated shift vectors are applied without regard to the fact whether or not these shift vectors are accurate may result in unwanted flicker.

This problem is solved by a method for generating images in digital subtraction angiography according to claim 1, a computer program product according to claim 13 which may carry out such a method, a machine-readable program storage device for storing such a computer program product, according to claim 14, and an X-ray diagnostic imaging system for generating images in digital subtraction angiography according to claim 15. Advantageous embodiments of the invention are subject-matter of the dependent claims.

The method of the invention may be applied in various kinds of digital subtraction angiography carried out with an X-ray diagnostic imaging system and comprises the following steps: Firstly, a mask image frame of a patient under examination is accessed. "Accessing" as used here and thereafter means that either image frames stored on a data carrier may be used, i.e. loaded in a processing unit, or may be acquired by the imaging system directly. Secondly, a series of live image frames of the patient under examination is accessed, wherein this series is acquired in the same imaging position as during the mask frame acquisition. In order to be able to carry out digital subtraction angiography, either the mask image frame is contrast-enhanced, or the live image frames are contrast-enhanced. Thereafter, in a region of interest (ROI) possible shift vectors are assumed and arranged in a matrix. Of each possible shift vector a scoring, which is a quality value, is calculated. As explained earlier, such a shift vector has to be used to compensate for movement between the time of acquisition of the mask image frame and the respective live image frame or between the various live image frames. Then it is determined, which of the possible shift vectors has the highest scoring, and this possible shift vector is chosen as an elected shift vector. The scoring of each possible shift vector is preferably determined by calculating the "sum of the squared differences" of the pixels in the region of interest. That is, on the one hand the mask image frame is shifted by the respective possible shift vector and subtracted from the respective live image frame. On the other hand, the non-shifted mask image frame is subtracted from the respective live image frame. Both subtractions result in respective gray scale values or color densities, respectively, for each pixel. Now the difference of the gray scale values or color densities in each pixel between the two subtraction results is calculated and squared. All of these squared values in the ROI are summed up and result in the scoring for each possible shift vector.

That one of the possible shift vectors which has the highest scoring is then chosen as an elected shift vector, i.e. which is a maximum. It may occur, however, that there are different elected shift vectors with corresponding maximums in the course of time. Therefore, in order to check whether such a maximum has a high quality, the likelihood representing a quality value of this maximum is calculated. Then, a modified shift vector depending on the elected shift vector and the likelihood p is calculated. Thereafter the mask image frame is shifted with respect to the respective live image frame by the modified shift vector. Then, the shifted mask image frame is subtracted from the respective live image frame and the result is displayed on a screen. Due to the modification of the shift vector depending on the likelihood p, the quality of the displayed image is improved and flickering is reduced or even completely avoided.

The scorings of the possible shift vectors may be imagined to be arranged in a matrix. This matrix is calculated for every pair of image frames. If not all values of the matrix were computed—e.g. due to performance issues of the processing system—these values are interpolated. Values at the border are set to the minimum value of the computed values in the matrix.

Preferably, for calculation of the respective likelihood p of the elected shift vector only the possible shift vectors, which have integer x and y components, are used, but no sub-pixel versions thereof. For the calculation of the modified shift vector or any other further vector, e.g. a filtered shift vector, however, preferably vectors having sub-pixel accuracy are used.

According to an advantageous embodiment of the invention, it is the mask image frame which is contrast-enhanced. In this way, the levels of contrast agent to which the patient is exposed may be minimized.

In case the accessing step of the live image frames includes the acquisition thereof by an X-ray diagnostic imaging system and not only the loading into a processing unit, live fluoroscopic roadmapping may be carried out.

According to a preferred embodiment of the invention, the likelihood p is calculated as the difference between the maximum and its surrounding, divided by the difference between the maximum and the minimum of the matrix of the possible shift vectors. This surrounding may e.g. be one pixel on either side of the maximum in each direction, or a square or a rectangle around the maximum having side lengths of several pixels.

The average of the surrounding is preferably an arithmetic average of the scoring of the possible shift vectors within a distance of d pixels, d being preferably approximately 5.

Testing of the method according the invention showed that very good results may be obtained when the shifting of the mask image frame is made dependent on a certain threshold value T1 of the likelihood p. This threshold value T1 is preferably 0.35.

An advantageous way to modify the shift vector consists in applying the following formula for calculating it:

$$(x',y')=(x_0,y_0)+t((x,y)-(x_0,y_0))/\|(x,y)-(x_0,y_0)\|,$$

wherein:
 (x',y') is the modified shift vector for the current live image frame,
 ($x_0,y_0$) is the elected shift vector for the previous live image frame,
 (x,y) is the current elected shift vector,
 t is a parameter, $0 \leq t \leq \|(x,y)-(x_0,y_0)\|$, which is preferably 1.

This means that, if p is below the threshold value T1, then the application of the elected shift vector is restricted or modified by normalizing the new shift vector to be within a given maximum distance t from the previously applied shift vector. This means in other words that the modified current optimum is obtained by moving the old optimum in the direction of the current optimum, but only by a factor t. In this manner, a sub-pixel shift is possible also in the invention, which provides for reliability and accuracy of the calculation of the new shift vector. This may be particular important in cases where the scanning is so coarse or rough that the real maximum is missed since it is not located at a position which may be reached with shift vector having integer-number components.

When in a sequence the modified shift vector is calculated for the first time, there is no "previously applied shift vector". Thus, the elected shift vector is used as the first modified shift vector. Hence, it is clear that the above-described procedure can be done starting only with the second image of each sequence. This results in a limitation of flickering, i.e. a smoothing. This normalization needs to be done only when it is necessary, that is when the quality of the optimum (represented by the likelihood p) is below the threshold value. This means in other words that in cases of maximums or optimums, respectively, having a low likelihood, the error by applying these optimum shift vectors is limited. As a consequence, the transition from one live image frame to the next one is smoothed, that is, that there are no "hard" transitions which would mean flickering.

The image quality may be further improved by applying a weighted mean filtering—which is a sliding filtering—to the above-mentioned shift vector which means applying the following formula:

$$(x'',y'')=((x',y')/k)+(1-1/k)(x_0,y_0),$$

wherein:
 (x'',y'') is the filtered shift vector,
 k is a parameter which is preferably 6 for p below T1 and 3 otherwise.

This means that there is a further smoothing which in this case occurs always, not only under certain circumstances.

The advantage of having always a smoothing may also be obtained in a further embodiment of the invention, wherein the modified shift vector is calculated by a weighted mean filtering which is applied to the elected shift vector according to the following formula:

$$(x''',y''')=((x,y)/k)+(1-1/k)(x_0,y_0)$$

wherein:
(x''',y''') is the current modified shift vector,
(x,y) is the elected shift vector for the current live image frame,
($x_0,y_0$) is the elected shift vector for the previous live image frame,
k is a parameter depending on the likelihood.

One preferred alternative is to introduce a distinction of cases with respect to the parameter k. In case the likelihood is above a threshold value (which is preferably around 0.35), k is chosen to be 3. In case the likelihood p is on or below the threshold value T2, k is chosen to be 6. This choice has the effect that for a "good" maximum, i.e. having a likelihood p above the threshold value T2, a third of the elected shift vector for the current live image frame is used for calculation of the modified shift vector, whereas two thirds of the elected shift vector for the previous live image frame are used therefor. In contrast thereto, in cases of a "bad" maximum, only one sixth of the elected shift vector for the current live image frame is used for calculation of the current modified shift vector whereas five sixth of the elected shift vector for the previous live image frame are used therefor. This means that the transitions occur very smoothly and that in other words no flicker occurs.

Another preferred alternative is to make the parameter k to a function of p, with k being larger as p is smaller. One example for such a function is: k=T2/p+c, wherein c is a constant having a value of about 2. In this alternative, the dependency of k from p is more linear as opposed to the previously described distinction of cases where a step-like dependency is applied.

The problem of the invention is also solved by a computer program product which is adapted to carry out any of the methods as previously described.

Such a computer program product may be stored on a program storage device which is machine-readable and may be used in an X-ray diagnostic imaging system to allow for carrying out any of the describe methods of the invention.

The problem of the invention is also solved by an X-ray diagnostic imaging system for generating images in digital subtraction angiography, in particular for conducting live fluoroscopic subtraction imaging. The imaging system comprises:
an X-ray source for directing X-ray radiation to a patient being examined;
an X-ray imaging device positioned for receiving the X-ray radiation and acquiring images in response thereto;
a processor arranged in communication with the X-ray source and X-ray imaging device to control acquisition of a mask image frame and live image frames, wherein one of the mask image frame and the live image frames is contrast-enhanced, to conduct a pixel shift vector calculation operation based on a region of interest (ROI) to realize a pixel shift vector to correct for motion between live image frames, to shift pixels comprising the mask image frame by pixel shift directions defined by the pixel shift vector, and to subtract the shifted mask image frame from the live image frames to realize improved images, in particular live roadmapping image frames;
and
a display for displaying the images.

BRIEF DESCRIPTION OF THE DRAWINGS

Further advantages and features of the present invention can be gained from the following detailed description of advantageous embodiments thereof, taken in conjunction with the accompanying drawings in which.

DETAILED DESCRIPTION OF THE INVENTION

Figure 1:
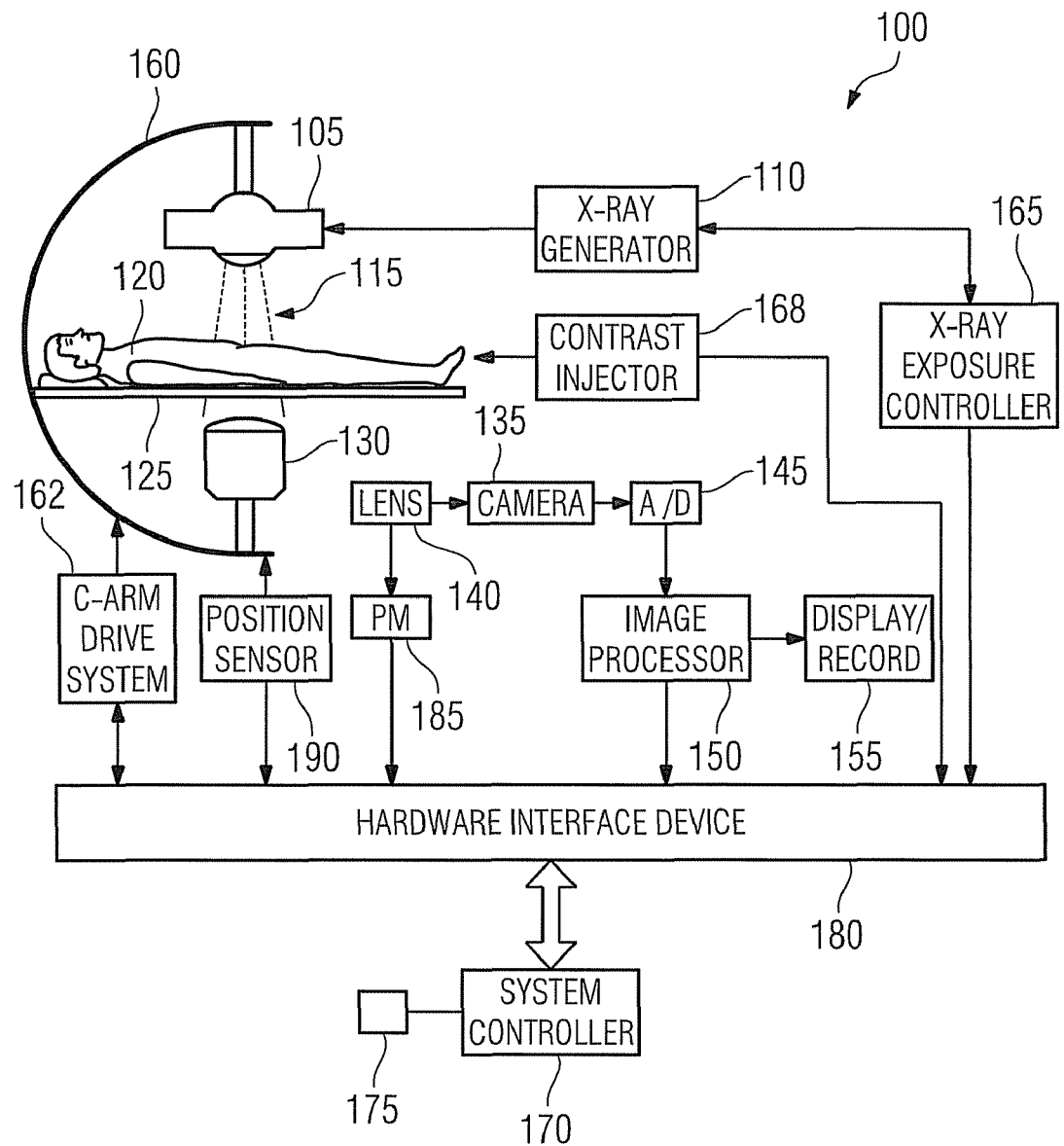
FIG. 1 schematic diagram depicting an X-ray diagnostic imaging system constructed to operate with an image intensifier to carry out live fluoro roadmapping with targeted automatic pixel shift of the invention.

Reference will now be made in detail to exemplary embodiments of the present invention, examples of which are illustrated in the accompanying drawings, wherein like reference numerals refer to like elements throughout. The terms "process" and "method" are generally used to refer to a series of operations performed by a processor, be it a central processing unit of an X-ray system for live fluoro roadmapping, or a secondary processing unit of such a system. Useful machines for performing exemplary operations of the present invention include the AXIOM family of X-ray diagnostic imaging systems and products, by Siemens Medical Systems. The inventive method or process, however, is not limited to implementation on Siemens' X-ray diagnostic imaging systems, but may be implemented in any known or future X-ray system arranged for conducting real-time X-ray subtraction imaging, including live fluoroscopic procedures.

FIG. 1 depicts an X-ray diagnostic imaging system 100 for live fluoro roadmapping that includes the automatic pixel shift ability of the invention. X-ray system 100 includes an X-ray tube or source 105 supplied by an X-ray power generator 110 for generating an X-ray beam 115. A patient 120 is shown supported on a patient-support table 125 so that the generated X-ray beam 115 passes through him/her onto an X-ray image intensifier tube 130 located on the patient support table 125 opposite the X-ray source. The image intensifier tube 130 provides an optical output that is imaged into a camera 135 such as a television camera, or video display camera and the like by means of a lens system 140. Although the image intensifier tube 130 would normally be arranged along an axis parallel to the axis of the X-ray beam input, a perpendicular path for the optical output is illustrated in FIG. 1 for viewing convenience and clarity. A video signal supplied from the camera 135 is digitized in an analog to digital (A/D) converter 145, and processed in an image processor 150. A display/record device 155 records and/displays the processed image(s), e.g., subtracted angio images, preferably in DICOM format. It should be noted that display/record device 155 includes a display for displaying the displayed image output, and a separate device for archiving. The image is arranged for storage in such a archive, e.g., a network device, in a DICOM format. The only exception is a VCR or DVR record, which stores a recorded version of the live displayed image, without transforming the image frame(s) into DICOM device; DVR and VCR are not DICOM devices.

A C-arm gantry arrangement 160 is provided to move the X-ray source 105 and image intensifier tube 130 in a controlled manner with respect to patient support table 125, by a C-arm drive system 162. An X-ray exposure controller 165, contrast medium injector 168 and system controller 170 are also included. System controller 170 may be a personal computer or any known controller capable of receiving and transmitting control signals to/from the above-described X-ray system components via a hardware interface 180. System controller 170 includes a user input device 175, such as a trackball, mouse, joystick, and/or computer keyboard to provide for user input in carrying out various system functions, and other system operation such as mode selection, linearity control, X-ray dose control, data storage, etc. Lens system 140 may include a beam splitting arrangement to direct a portion of the light responsive to an acquired X-ray image to a photomultiplier tube 185 to generate a light level responsive signal. The light level responsive signal is used by X-ray exposure controller 165 for controlling X-ray exposure. A position measuring device or sensor 190 is included to accurately indicate the relative position between the C-arm 160 and patient support table 125.

An embodiment of the invention is implemented by X-ray diagnostic imaging system 100 as follows. A clinician or other user view the real-time 2D subtraction images during a live fluoro roadmapping procedure may position a ROI (for example, 1/16 of the image area or less) within a broader area of interest using the user input device 175, connected to system controller 170. A shift vector is calculated by the system controller 170, image processor 150 or other processor based on the ROI, and used in the imaging pipeline after a displayable image has been computed. The shift vector is then available for application in the subtraction process when the following X-ray frame is ready for processing.

Figure 2:
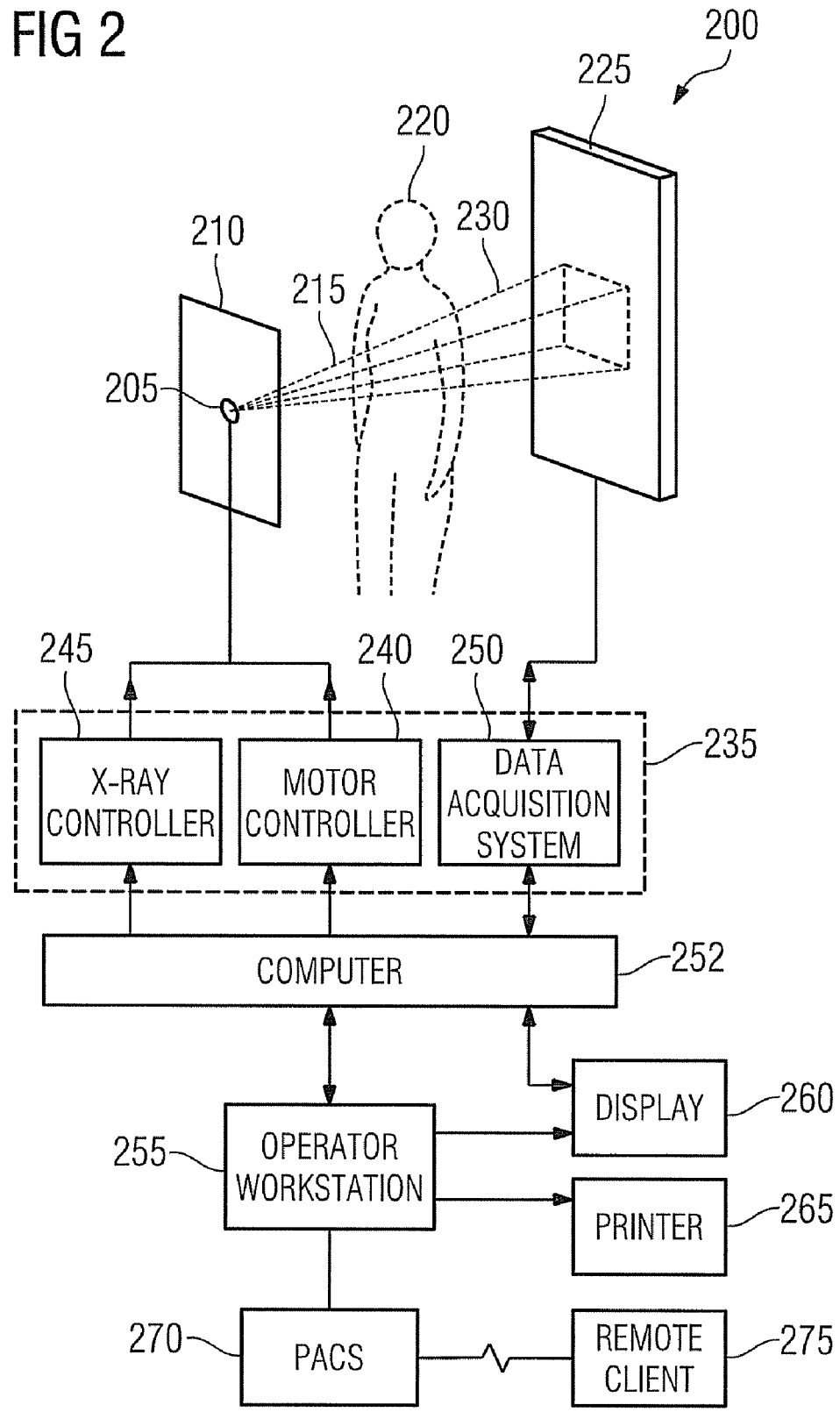
FIG. 2 is schematic diagram depicting an X-ray diagnostic imaging system constructed to operate with a flat panel detector to carry out live fluoro roadmapping with targeted automatic pixel shift of the invention.

FIG. 2 shows a second embodiment of an X-ray diagnostic imaging system 200 arranged for acquiring and processing fluoroscopic images, and for implementing an exemplary automatic pixel shift operation of the invention. System 200 includes an X-ray source 205, such as an X-ray tube and associated support and filtering components. The X-ray source may be affixed to a support, such as a C-arm fluoroscope stand, or examination table, which would allow the X-ray source to be moved within a constrained region. The constrained region may be arcuate or otherwise three dimensional, depending on the nature of the support structure. For simplicity, the constrained region of FIG. 2 is depicted as a plane 210, within which the source 205 may move in two dimensions. A collimator may also be included, which will define the size and shape of X-ray beam 215 emerging from the source.

The beam 215 passes through a patient 220 and impacts an X-ray detector 225. In practice, X-ray detector 225 may comprise an image intensifier, such as image intensifier 130 of system 100 depicted in FIG. 1 herein. For that matter, while the inventive X-ray system 100 is an image intensifier-based system for implementing the pixel shift vector calculation for fluoroscopic roadmapping, system 200 is a preferred system for implementing an embodiment of the invention. And as should be obvious to the skilled artisan, that X-ray diagnostic imaging system 200, because it does not require a traditional image intensifier, such as image intensifier 130 of FIG. 1, does not require certain parts of the FIG. 1 image intensifier imaging chain, i.e., photomultiplier tube (PM) 185, lens device 140, A/D converter 145 and camera 135. Instead, a flat panel detector such as detector 225 of FIG. 2 instead acquires digital image frames directly, which are then transferred to the image processor (processor 150 of FIG. 1).

For real-time viewing, the image may be acquired by system 200 using a video camera with a charge-coupled device (CCD), or comprise a flat detector array. In such case, pixels comprising the flat detector array produce electrical signals representing the intensity of the incident X-rays. An X-ray shield with an opening for a stream of radiation 230 may be included to shield the clinician from X-ray scatter. The X-ray source is controlled by a system controller 235, which typically controls power and control signals for live fluoroscopic roadmapping and like fluoro procedures. The system controller 235 may execute signal processing and filtration functions, including the dynamic pixel shift analysis, and shifting function, upon receipt of user input defining the small ROI discussed in detail above. The system controller 235 moves the source 205 via motor controller 240, and may move the patient 220 and detector 225, and X-ray activation and operation via X-ray controller 245. The system controller may also include an acquisition system 250 in communication with the detector 225, to convert the data to digital signals for processing on a computer 252 (if required). The processed image data are reconstructed into an image that may include various regions of interest (ROI) for diagnosis and evaluation, and the pixel shift function for motion correction of the invention.

The computer 252 may be configured to control features enabled by system controller 235, and receive commands and scanning parameters via an operator workstation 255, equipped with a keyboard, mouse, joystick or other input device for user control while system 200 implements the pixel shift function, and other operations. The computer 252 provides the live fluoro frames to a display 260. The operator workstation may control the displayed images as described, providing the images to a printer 265, and a PACS 270, which may communicate the fluoro images to a remote network, or client 275. Client 275 may be a radiology department information system (RIS), hospital information system (HIS), internal or external network or just a remote standalone work station.

Figure 3:
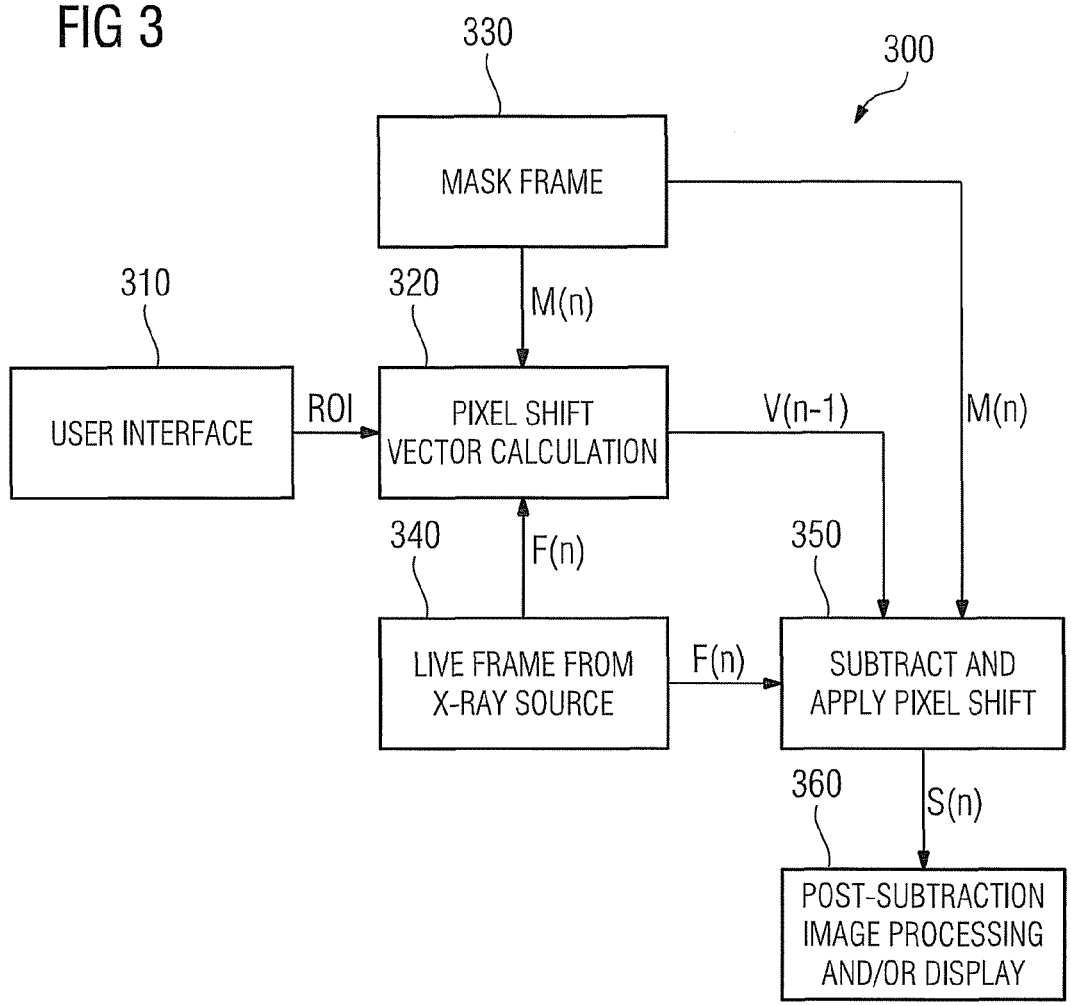
FIG. 3 is a schematic block diagram depicting the functional flow of the inventive targeted automatic shift vector calculation for real-time live fluoro roadmapping of the invention.

FIG. 3 depicts a schematic block diagram 300 that highlights an exemplary functional operation of the inventive live fluoro roadmapping process with pixel shift ability of the invention. The exemplary inventive functioning may be carried out in a system such as X-ray imaging system 100, and X-ray imaging system 200, or any other known X-ray fluoroscopy system that may be constructed to implement the FIG. 3 operation. Functional block 310 represents that the clinician may choose an ROI (e.g. 1/16 of a frame area) via a user interface, such as user device 175 or FIG. 1, or operator workstation 255 of FIG. 2. The pixel coordinates are provided to a system controller, such as controller 170 of FIG. 1, or system controller 235 of FIG. 2.

Functional block 320 represents the shift vector calculation. That is, the ROI-defined pixel coordinates are provided to a pixel shift calculator function in the background process to generate the shift vector. The dynamic process includes the input of a current mask frame (M(n)), indicated by functional block 320, and the input of a live frame (F(n)), indicated by functional block 340. Functional block 350 represents a portion of the process wherein a prior shift vector calculation (V(n−1)) is applied to the mask frame M(n) and so the live frame F(n) during the subtraction. A subtracted result (S(n)) may be displayed, or subjected to further processing. Such display is represented by functional block 360. The background process is carried out in a processor such as processor 150 of FIG. 1, or computer 250 of FIG. 2, coordinated with the system controller.

Figure 4:
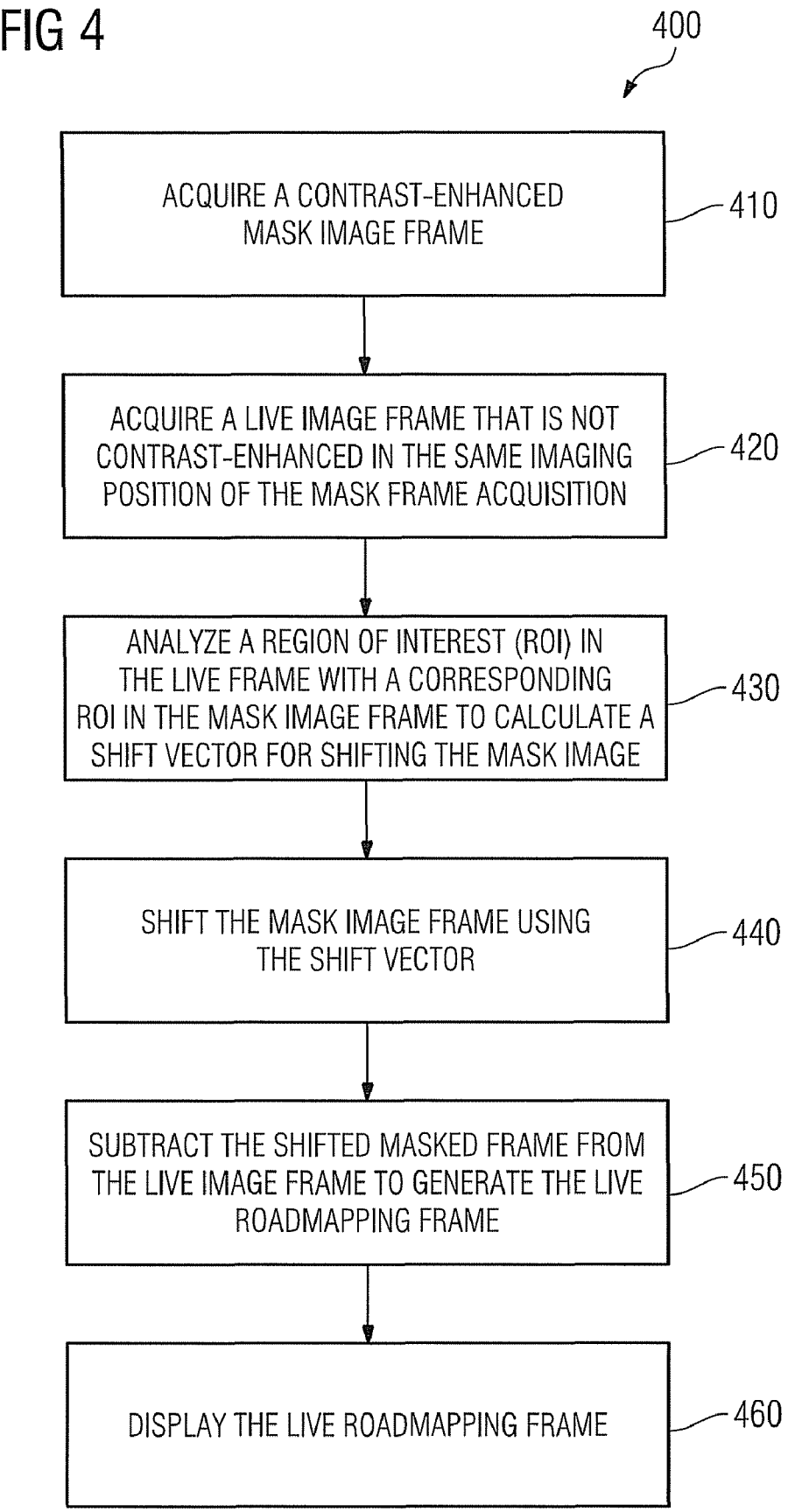
FIG. 4 is a schematic flow diagram of a method for carrying out the inventive targeted automatic shift vector calculation, and misregistration correction thereby for real-time live fluoro roadmapping of the invention.

FIG. 4 is a schematic flow diagram depicting an exemplary method 400 for live fluoroscopic roadmapping of the invention. Block 410 represents a step of acquiring a contrast-enhanced mask image frame of a patient under examination. Block 420 represents a step of acquiring a live image frame that is not contrast-enhanced in the same imaging position of the mask frame acquisition. Block 430 represents a step of analyzing the pixels in a region of interest (ROI) in the live frame with a corresponding ROI in the mask image frame to calculate a shift vector before subtraction from the live image frame. Block 440 represents a step of shifting the mask image frame using the shift vector. Block 450 represents a step of subtracting the shifted mask frame from the live image frame to generate the live roadmapping frame. Block 460 represents a step of displaying the live roadmapping frame.

Block 430 generally represents a step of analyzing the pixels in a region of interest (ROI) in the respective live frame with respect to a corresponding ROI in the mask image frame to calculate an ideal shift vector before subtraction from the live image frame.

Figure 5:
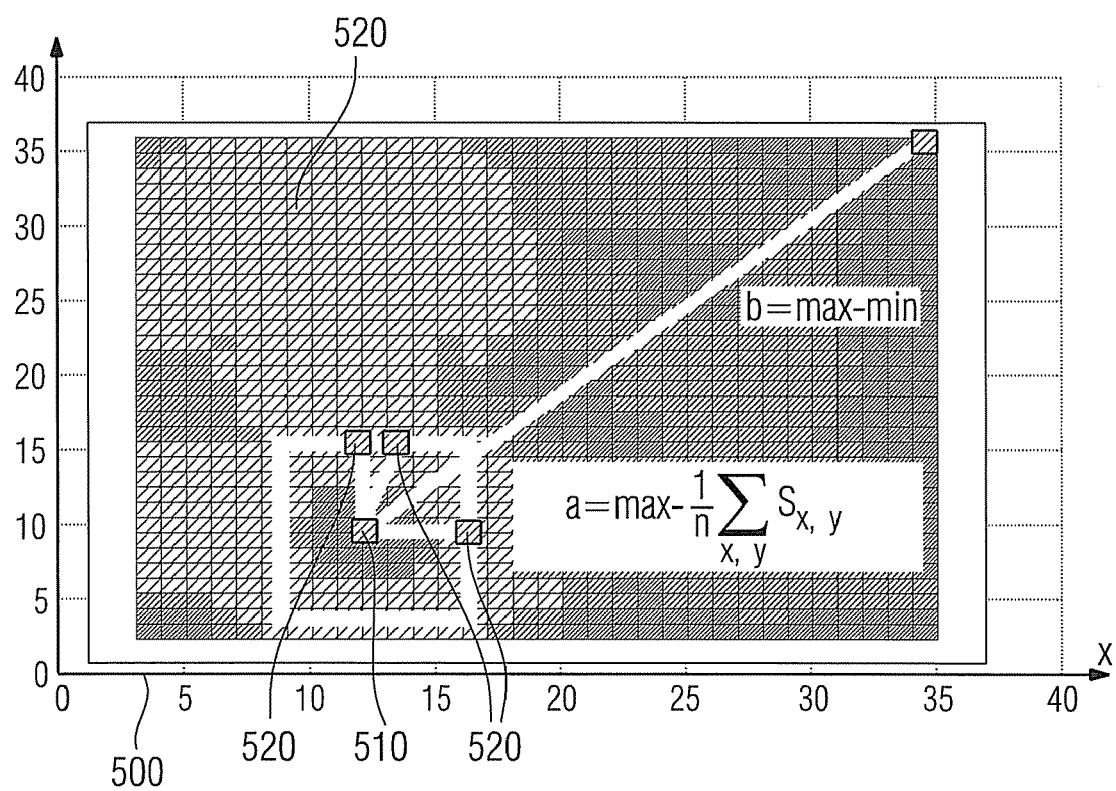
FIG. 5 is a sketch of a matrix with possible shift vectors, wherein the scoring thereof is indicated by a gray scale value.

The core of the invention is to be found in Block 430 which will be described in further detail by further reference to FIG. 5. First of all, a series of possible shift vectors 520 for shifting the mask image frame in the x direction and the y direction are arranged in a matrix 500, where the x axis and the y axis indicate the amount of pixels by which a possible shift vector 520 would shift the mask image frame. For each of these possible shift vectors a scoring $S_{x,y}$ is given which is indicated by a gray scale value, i.e. the darker the grey scale value is the higher is the scoring $S_{x,y}$. The scoring of each possible shift vector may be determined, as an example, by calculating the "sum of the squared differences" of the pixels in the region of interest. That is, on the one hand the mask image frame is shifted by the respective possible shift vector and subtracted from the respective live image frame. On the other hand, the non-shifted mask image frame is subtracted from the respective live image frame. Both subtractions result in respective gray scale values for each pixel. Now the difference of the gray scale values in each pixel between the two subtraction results is calculated and squared. All of these squared values in the ROI are summed up and result in the scoring for each pixel.

From all these possible shift vectors 520, that one having the highest scoring is chosen as an elected shift vector 510. For this elected shift vector 510 the likelihood p is calculated which represents a quality value thereof. This quality vector gives an indication of the likelihood p with which this elected shift vector 510 is accurately calculated. The likelihood p is calculated in the following way: As a first step, the difference a is determined which is the difference between the scoring of the elected shift vector 510 and an arithmetic average of the scoring $S_{x,y}$ of possible shift vectors 520 which lie within a certain neighbourhood of the elected shift vector 510. While this neighbourhood could be a circle or an ellipse around the elected shift vector 510, it is preferred to use a square or a rectangle around the elected shift vector 510. The preferred side length of such a rectangle or square is approximately 5 pixels. The calculation of the value a as also indicated in FIG. 5 is carried out using the following formula:

$$a = \max - 1/n \Sigma_{x,y} S_{x,y}$$

As a next step, the difference b is calculated, which is the difference between the scoring $S_{x,y}$ of the elected shift vector and the lowest scoring $S_{x,y}$ of the possible shift vectors. Afterwards, the likelihood p is determined as the quotient a/b. FIG. 5 sketches the computation of a and b, where the x axis and the y axis represent shift values in these directions. The gray scale value at the respective pixels indicates the scoring $S_{x,y}$ of the respective possible shift vectors.

The idea of the invention is to restrict the application of the elected shift vector 510 in those cases where p is below a given threshold value T1, i.e. in cases the likelihood p of the elected shift vector 510 is so low that the likelihood p that this elected shift vector is accurately calculated is low. This restriction is done by creating a modified shift vector by normalizing it to be within a given maximum distance t from the previously applied shift vector, i.e. the shift vector applied for the previous live image frame. This means that, in case the application of such a modified shift vector would introduce an error in the DSA image, this error can be limited. For the calculation the following formula is used:

$$(x',y') = (x_0, y_0) + t((x,y) - (x_0, y_0)) / \|(x,y) - (x_0, y_0)\|,$$

wherein:
(x',y') is the modified shift vector for the current live image frame,
$(x_0, y_0)$ is the elected shift vector for the previous live image frame,
(x,y) is the current elected shift vector,
t is a parameter, $0 \leq t \leq \|(x,y) - (x_0, y_0)\|$, which is preferably 1.

The modified shift vector is thus obtained by moving the old elected shift vector in the direction of the current elected shift vector, but only by the factor t. This is done starting with the second image of each sequence.

It has been found out that a value of 0.35 for t gives good results. As an alternative, it would also be possible to substitute the parameter t by the quotient $p\|(x,y) - x_0, y_0)\|/T1$ in case p is below the threshold value T1 and to use a value of $t = \|(x,y) - x_0, y_0)\|$ for cases t is on or above the threshold value T1. As a further alternative, other linear or exponential functions for describing the dependency of t from p and T1 may be used.

In order to obtain an even more smooth transition between consecutive images of a sequence, i.e. consecutive live image frames, a weighted mean filtering (first order recursion) of the modified shift vector is performed. It is clear that this can be done starting only with the second image of each sequence. This weighted mean filtering is carried out using the following formula:

$$(x'', y'') = (x', y')/k) + (1 - 1/k)(x_0, y_0),$$

wherein:
(x'', y'') is the filtered shift vector,
k is a parameter.

This results in that the flickering is still further reduced since there is always a smoothing between consecutive live image frames. For the weighted mean filtering, a distinction of cases is made: In case the likelihood p is above a threshold value T2 (which is also preferably 0.35), it is preferred to choose k to be 3. In case p is on or below that threshold value T2, k assumes the value 6. This means that for a low likelihood p only a smaller portion of the modified shift vector for the current live image frame is used, whereas for a high likelihood p a higher portion of this modified shift vector for the current live image frame is used.

As an alternative to this step-like distinction of cases, the parameter k may be chosen to follow a continuous equation like k=T2/p+2. In this manner, an adaptive change of k depending on the likelihood p and/or the threshold value T2 thereof may be obtained.

According to a further embodiment of the method of the invention, the weighted mean filtering may be carried out on the elected shift vector 510, i.e. without performing a normalization using the parameter t. Also in this instance, a continuous smoothing of the sequence of images, i.e. the sequence of live image frames, is obtained since never a completely new shift vector is used and could therefore—in case it is highly different from the one used for the previous live image frame—create flicker, but only a portion of the new elected shift vector enters into the calculation of the filtered shift vector. This may result in a non-optimal shifting of the mask image frame before digital subtraction, but since typically ten frames are used per second, the latency until an optimal or nearly optimal shifting and therefore image representation is achieved, is tolerable.

It is to be noted that the invention is not limited to the embodiments described above. On the contrary, any features described in the description and claims may be combined with each other, unless this was otherwise stated or is technically self-evident.

LIST OF REFERENCE NUMBERS

100 X-ray system
105 X-ray source
110 X-ray power generator
115 X-ray beam
120 patient
125 patient support table
130 image intensifier tube
135 camera
140 lens system
145 (A/D) converter
150 image processor
155 display/record device
160 C-arm gantry arrangement
162 C-arm drive system
165 X-ray exposure controller
168 contrast medium injector
170 system controller
175 user input device
185 photomultiplier tube
190 sensor
200 X-ray diagnostic imaging system
205 X-ray source
210 plane
215 X-ray beam
220 patient
225 X-ray detector
230 radiation
235 system controller
240 motor controller
245 X-ray controller
250 acquisition system
252 computer
255 operator workstation
260 display
265 printer
270 PACS
275 client
300 block diagram
310 user interface
320 shift vector calculation
330 current mask frame
340 live frame input
350 subtraction an pixel shift
360 further processing
400 method
410 acquiring a contrast-enhanced mask image frame
420 acquiring a live image frame
430 analyzing the pixels, calculating a shift vector
440 shifting the mask image frame
450 subtracting the shifted mask frame
460 displaying the live roadmapping frame
500 matrix
510 elected shift vector
520 possible shift vectors

The invention claimed is:

1. A method for generating images in digital subtraction angiography with an X-ray diagnostic imaging system, comprising the following steps:
   accessing a mask image frame of a patient under examination;
   accessing a series of live image frames of the patient under examination acquired in the same imaging position of the mask frame acquisition, wherein one of the mask image frame and the live image frames is contrast-enhanced;
   assuming possible shift vectors in a region of interest and calculating a scoring thereof, each possible shift vector being a difference vector between the mask image frame and a respective live image frame,
   determining the possible shift vector with the highest scoring and choosing it as an elected shift vector,
   calculating a likelihood p representing a quality value of the elected shift vector,
   calculating a modified shift vector depending on the elected shift vector and the likelihood p,
   shifting the mask image frame with respect to the respective live image frame by the modified shift vector,
   subtracting the shifted mask image frame from the respective live image frame, and
   displaying the respective subtracted image frame.

2. The method of claim 1, wherein the mask image frame is contrast-enhanced.

3. The method of claim 1, wherein accessing the series of live image frames includes acquisition thereof in order to carry out live fluoroscopic roadmapping.

4. The method of claim 1, wherein the likelihood p is calculated according to the following formula:

$$p = a/b,$$

wherein:
   a is the difference between the highest scoring and an average of the surrounding thereof, and
   b is the difference between the highest scoring and the lowest scoring of the possible shift vectors.

5. The method of claim 4, wherein the average of the surrounding is an arithmetic average of the scoring of possible shift vectors within a distance of d pixels, d being preferably about 5.

6. The method of claim 4, wherein the surrounding is one of a rectangle and a square around the elected shift vector with the highest scoring.

7. The method of claim 4, wherein shifting of the mask image frame depends on whether the likelihood p is below a threshold value T1, which is preferably 0.35.

8. The method of claim 1, wherein the modified shift vector is calculated by the formula:

$$(x',y') = (x_0, y_0) + t((x,y) - (x_0, y_0)) / |(x,y) - (x_0, y_0)|,$$

wherein:
   (x', y') is the modified shift vector for the current live image frame, ($x_0$,$y_0$) is the elected shift vector for the previous live image frame, (x,y) is the current elected shift vector, t is a parameter, $0 \leq t \leq \|(x,y)-x_0,y_0\|$, which is preferably 1.

9. The method of claim 8, wherein a weighted mean filtering is applied to the modified shift vector according to the formula:

$$(x'',y'') = ((x',y')/k) + (1-1/k)(x_0,y_0),$$

wherein:

(x'', y'') is the filtered shift vector, k is a parameter depending on the likelihood p.

10. The method of claim 1, wherein the modified shift vector is calculated by a GGM (gliding geometrical mean) filtering applied to the elected shift vector according to the formula:

$$(x''',y''') = ((x,y)/k) + (1-1/k)(x_0,y_0),$$

wherein:

(x''', y''') is the current modified shift vector, (x,y) is the elected shift vector for the current live image frame, ($x_0$,$y_0$) is the elected shift vector for the previous live image frame, k is a parameter depending on the likelihood p.

11. The method of claim 9 or 10, wherein k=3 in case the likelihood p is above a threshold value T2, which is preferably 0.35, k=6 in case the likelihood p is on or below the threshold value T2.

12. The method of claim 10, wherein k is defined as:

$$k = T2/p + c,$$

wherein c is a constant, which is preferably about 2.

13. A non-transitory program storage device readable by machine, tangibly embodying a computer program product of instructions executable by the machine to perform method steps for generating images in digital subtraction angiography with an X-ray diagnostic imaging system, where the method allows for improving the image quality as set forth in claim 1.

14. An X-ray diagnostic imaging system for generating images in digital subtraction angiography, in particular for conducting live fluoroscopic subtraction imaging, comprising:

an X-ray source for directing X-ray radiation to a patient being examined;

an X-ray imaging device positioned for receiving the X-ray radiation and acquiring images in response thereto;

a processor arranged in communication with the X-ray source and X-ray imaging device to control acquisition of a mask image frame and live image frames, wherein one of the mask image frame and the live image frames is contrast-enhanced, to conduct a pixel shift vector calculation operation based on a region of interest (ROI) to realize a pixel shift vector to correct for motion between live image frames, to shift pixels comprising the mask image frame by pixel shift directions defined by the pixel shift vector, and to subtract the shifted mask image frame from the live image frames to realize improved images, in particular live roadmapping image frames; and a display for displaying the images, wherein the processor is configured to:

assume possible shift vectors in the region of interest and calculating a scoring thereof, each possible shift vector being a difference vector between the mask image frame and a respective live image frame, determine the possible shift vector with the highest scoring and choosing it as an elected shift vector, calculate a likelihood p representing a quality value of the elected shift vector, calculate a modified shift vector depending on the elected shift vector and the likelihood p, shift the mask image frame with respect to the respective live image frame by the modified shift vector, and subtract the shifted mask image frame from the respective live image frame.

15. The method of claim 1, wherein a smaller portion of the modified shift vector is used for the respective live image frame for a low likelihood p, and wherein a higher portion of the modified shifty vector is used for the respective live image frame for a high likelihood p.

* * * * *

UNITED STATES PATENT AND TRADEMARK OFFICE
CERTIFICATE OF CORRECTION

PATENT NO. : 8,299,413 B2  
APPLICATION NO. : 12/350395  
DATED : October 30, 2012  
INVENTOR(S) : Florian Vogt and John Baumgart Page 1 of 1

It is certified that error appears in the above-identified patent and that said Letters Patent is hereby corrected as shown below:

Replace formula "$(x',y')=(x_0,y_0)+t((x,y)-(x_0,y_0))/|(x,y)-(x_0,y_0)|$" in claim 8 at column 12 line 63 with --$(x',y')=(x_0,y_0)+t((x,y)-(x_0,y_0))/\|(x,y)-(x_0,y_0)\|$--.

Signed and Sealed this  
Nineteenth Day of February, 2013

Teresa Stanek Rea  
*Acting Director of the United States Patent and Trademark Office*